May 13, 1924.

M. KUSCH 1,493,861

SEPARATION OF SOLIDS FROM LIQUIDS

Filed Dec. 30, 1920

Inventor:
Max Kusch.

Patented May 13, 1924.

1,493,861

UNITED STATES PATENT OFFICE.

MAX KUSCH, OF BERLIN-FRIEDENAU, GERMANY.

SEPARATION OF SOLIDS FROM LIQUIDS.

Application filed December 30, 1920. Serial No. 434,166.

(GRANTED UNDER THE PROVISIONS OF THE ACT OF MARCH 3, 1921, 41 STAT. L., 1313.)

*To all whom it may concern:*

Be it known that I, MAX KUSCH, a resident of Berlin-Friedenau, Germany, have invented certain new and useful Improvements in the Separation of Solids from Liquids (for which I have obtained patents as follows: German Patent Number 292,212, dated Mar. 25th, 1914; Austrian Patent Number 71,820, dated May 25th, 1916; German Patent Number 293,066, dated Sept. 11th, 1915; Belgium, Patent Number 288,526, dated July 3rd, 1920; France, Patent Number 517,706, dated June 24th, 1920; Czechoslovakia, Patent No. 1124, dated Jan. 27th, 1920), of which the following is a specification.

My device relates in general to cleaning or settling apparatus in which the mixture of liquids and solids is separated into three portions, comprising a swimming layer or upper layer, a settling layer of sludge, and a liquid.

It relates to that type of device in which the material to be separated is introduced below the liquid surface.

Specifically the invention provides a structure and process of operation in which the material is introduced through oppositely directed influent channels, or intake conduits, facing each other, and having V-shaped or wedge-shaped baffles therebetween, thereby breaking up the influent streams into upwardly and downwardly directed currents respectively, so that the lighter matter rises, the heavier matter sinks, and the liquid remaining is carried away by a suitable effluent channel or overflow passage.

A more definite idea of the apparatus and mode of operation will be clearly understood from the following description, considered with the accompanying drawings, in which:—

Figure 1:
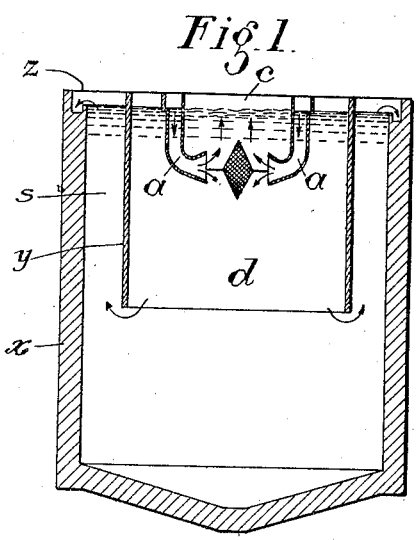
Figure 1 is a vertical sectional view through the center of a representative embodiment of this invention.
Figure 2:
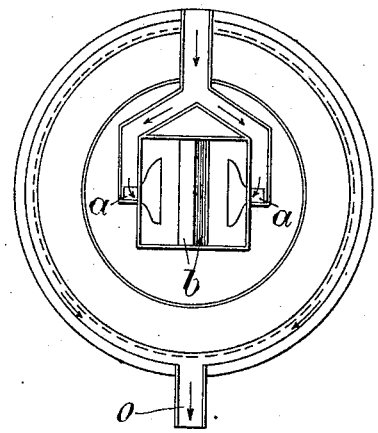
Figure 2 shows a plan view of the device represented in Figure 1.

Referring to the drawings, and more particularly to Figures 1 and 2, $x$ represents a receptacle capable of holding liquid, $y$ a cylindrical baffle set therein and so positioned as to form an annular space $s$ between the inner surface of $x$ and the outer surface of $y$. An influent channel is shown having two branches $a$—$a$ which terminate beneath the liquid surface. These two influent outlets have gradually increasing areas toward their ends. The baffle surfaces are shown as having their backs abutting, and extending horizontally transversely of said orifices. Inclined plane surfaces are thereby provided wherein two plane surfaces are inclined upwardly and downwardly respectively, and away from each of said orifices. Said two surfaces meet, thereby forming an edge which faces its respective influent opening and extends horizontally in front of said orifice. An effluent channel is shown at $z$, and is formed as an annular groove or spillway in the upper edge of the container $x$. This has a single outlet as shown at $o$, in Figures 2 and 4.

Figure 3:
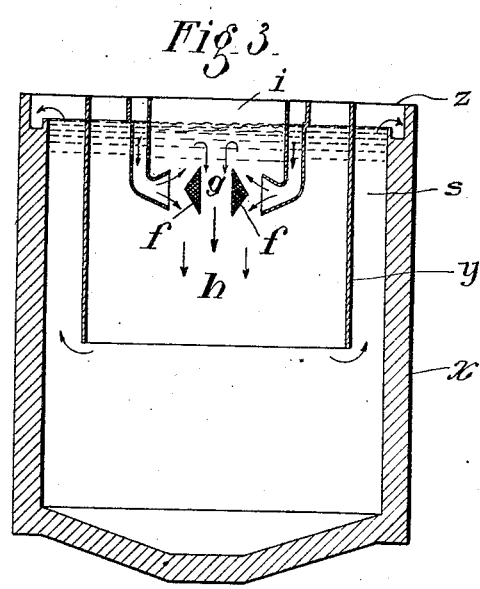
Figure 3 shows a structure similar to that illustrated in Figure 1, with a modified arrangement of the baffles between the influent orifices or outlets.
Figure 4:
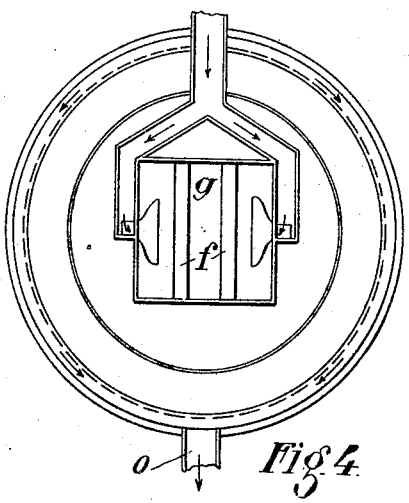
Figure 4 shows a plan view of the device represented in Figure 3.

Figures 3 and 4 show a modification of the device represented in Figures 1 and 2. This modification resides in the spacing apart of the baffle surfaces as at $b$—$b$, thus forming a channel or passageway $g$ between them for the passage of matter.

In operation the device functions as follows:

The speed of the mixture of liquid and solids to be separated entering through the influent channels $a$—$a$ gradually decreases in velocity due to the increase in cross sectional area of the channels $a$—$a$. The mixture is then ejected from these channels and is deflected, by the arrangement of baffle surfaces $b$, into an upward current and a downward current. The matter of less specific gravity rises to the surface of the liquid as at $c$, carried by the upward current. The matter of greater specific gravity is carried downward to the space within and at the lower portion of the baffle cylinder $y$, designated as $d$, from which point it settles out and drops to the bottom of the receptacle $x$, from which it may be drawn off or pumped out by any suitable apparatus, not shown. The liquid which has thus been freed of the solid matter passes out under the cylindrical baffle y, as indicated by the arrows, and passes up, through space s, and overflows into effluent channel z, from where it passes out of o as indicated by arrows in Figures 2 and 4.

In the modifications shown in Figures 3 and 4, it will be noted that the difference resides in the fact that the inclined or V-shaped baffle surfaces are separated so as to form a space or channel g therebetween. The letters f designate the lower deflecting surfaces. This is done to obviate any detrimental currents which might find their way up into space i where the swimming layer collects within the cylindrical baffle y at its upper extremity, and so disturb the swimming layer of relatively light material. By this modification the currents which pass upwardly over the upwardly inclined plane surfaces of the deflecting baffles after giving up the swimming matter pass downwardly through the passage g and thence to h where the heavier matter drops down, the operation from here on being similar to that just described in connection with Figure 1.

It will thus be seen that the current flowing out of one influent branch flows against the current flowing out of the opposite influent branch, thereby sharply checking the speed of each current. This checking of the speed of influent currents is further augmented by interposing the baffle surfaces therebetween. This action allows the solid matter to be more readily separated from the liquid, the lighter matter rising and the heavier matter sinking.

I claim:

1. In a separating device for dividing from a liquid relatively light and relatively heavy material carried thereby, the combination of an influent channel having an outlet extending horizontally and lying beneath the liquid surface, and a V-shaped deflecting surface having one surface inclined upwardly and the other downwardly and having the point of the V in front of and toward said outlet and arranged so as to divide the influent liquid into two oppositely directed currents, one of said currents passing in an upward direction and the other in a downward direction.

2. In a separating device for dividing from a liquid relatively light and relatively heavy material carried thereby, the combination of an influent channel having an outlet with gradually increasing cross sectional area and extending horizontally and lying beneath the liquid level, and a transversely disposed baffle having one surface inclined upwardly and the other downwardly in the form of a V-shaped surface having the point of the V in front of and toward said influent channel, said baffle operating to divide the influent liquid into two oppositely directed currents, one of said currents passing in an upward direction and the other in a downward direction.

3. In a separating device for dividing from a liquid relatively light and relatively heavy material carried thereby, the combination of an influent channel having an outlet with gradually increasing cross sectional area and extending horizontally and lying beneath the liquid level, and a transversely disposed baffle with a V-shaped surface in front of said influent channel, and a second baffle positioned opposite said outlet opening having a first upwardly extending plane surface and a second downwardly extending plane surface positioned obliquely to said first surface, and a second influent channel having a discharge outlet positioned to discharge toward said second baffle.

4. In a separating tank for dividing from a liquid relatively light and relatively heavy material carried thereby, in combination an influent channel, said channel divided in two branches each of which gradually increases in area toward its outlet end, both of said branches having their outlet ends submerged beneath the liquid surface of said tank and said outlet ends being disposed toward each other, and deflecting means positioned between said outlet ends, said deflecting means providing two surfaces opposite each outlet end inclined upwardly and downwardly respectively and away from each of said outlet branches of said influent channel.

5. In a separating tank for dividing from a liquid relatively light and relatively heavy material carried thereby, in combination two influent outlets beneath the liquid level of said tank, said outlets facing each other, deflecting walls arranged between said outlets and adapted to divert upwardly the upper portion of the influent stream and divert downwardly the lower portion of the influent stream.

6. In a separating device for dividing from a liquid relatively light and relatively heavy material carried thereby, in combination a plurality of influent outlets beneath the liquid level of said tank, said outlets facing toward a common center and deflecting walls arranged between said outlets and adapted to divert upwardly the upper portion of the influent stream and divert downwardly the lower portion of the influent stream.

7. In a separating device for dividing from a liquid relatively light and relatively heavy material carried thereby, in combination a plurality of influent outlets with horizontally extending ends, deflecting surfaces arranged respectively in front of each of said influent outlets and having oppositely disposed guide walls sloping away from each of said influent outlets and upwardly and downwardly from in front of the respective outlets.

8. In a separating device for dividing from a liquid relatively light and relatively heavy material carried thereby, a container, a baffle cylinder within said container, two influent orifices within said cylinder, said orifices being below the liquid surface and facing each other transversely of said container in such a manner that the two influent streams from said orifices flow in opposite directions and toward each other, V-shaped baffle surfaces arranged in front of each orifice, each baffle having one surface inclined upwardly and the other downwardly with the tip of the V in front of and toward the orifice, and an effluent channel for the cleansed liquid.

9. In a settling device for treating a mixture of solids and liquids to settle the heavy matter from the lighter matter, in combination with inlet pipes the arrangement of a deflecting body extending horizontally between the inlet pipes below the liquid surface of the water to be cleansed, said body having surfaces extending obliquely upwardly and downwardly.

10. In a settling device for treating a mixture of solids and liquids, the combination with a plurality of inlet pipes of deflecting bodies oppositely arranged to the inlet pipes of the liquid material to be treated providing a channel between the deflecting bodies.

11. In a separating device, the combination of a plurality of influent channels, each having a discharge outlet lying beneath the liquid surface, a plurality of V-shaped deflecting baffles, one for each outlet and having the tip of the V positioned in front of and toward its respective outlet, said baffles being spaced apart and providing a channel therebetween.

12. In a separating device, the combination of a plurality of influent channels, each having a discharge outlet lying beneath the liquid surface and positioned to discharge toward each other, a plurality of V-shaped deflecting baffles, one for each outlet and having the tip of the V positioned in front of and toward its respective outlet, said baffles being spaced apart and providing a channel therebetween, the respective baffles of oppositely discharging openings being spaced apart and having a channel therebetween on the side thereof opposite the tip of the V.

In testimony whereof, I affix my signature in the presence of two witnesses.

MAX KUSCH.

Witnesses:
R. RATNE,
FABIAN